G. E. CASSEL.
POWER TRANSMISSION GEAR.
APPLICATION FILED DEC. 20, 1917.

1,277,193.

Patented Aug. 27, 1918.
6 SHEETS—SHEET 1.

Inventor,
Gunnar Elias Cassel.
By Henry Ostby
Atty.

G. E. CASSEL.
POWER TRANSMISSION GEAR.
APPLICATION FILED DEC. 20, 1917.

1,277,193.

Patented Aug. 27, 1918.
6 SHEETS—SHEET 2.

Inventor,
Gunnar Elias Cassel,
By [signature] Atty.

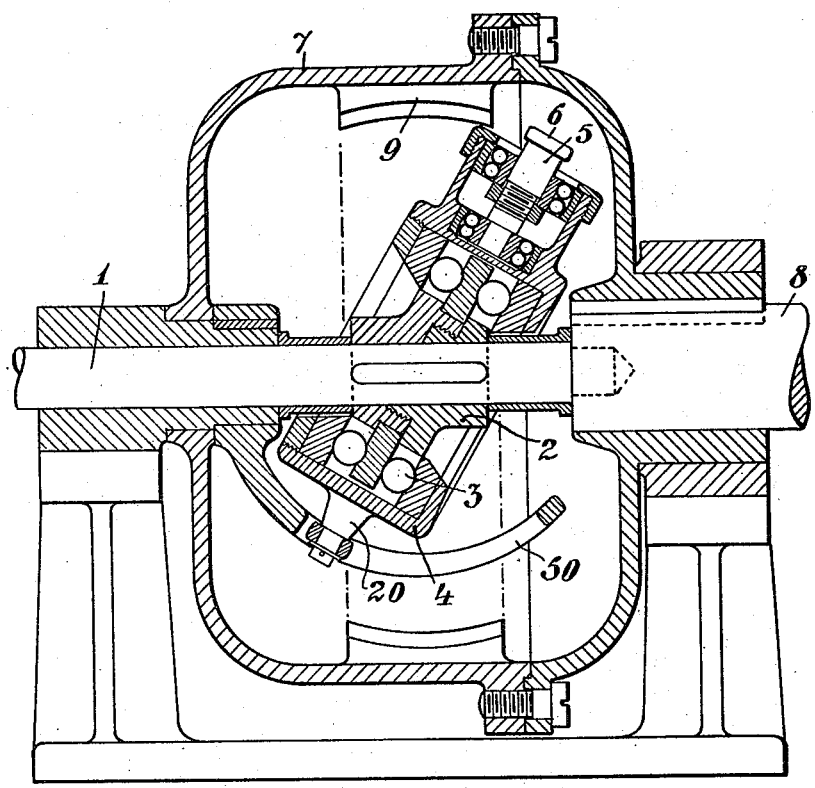

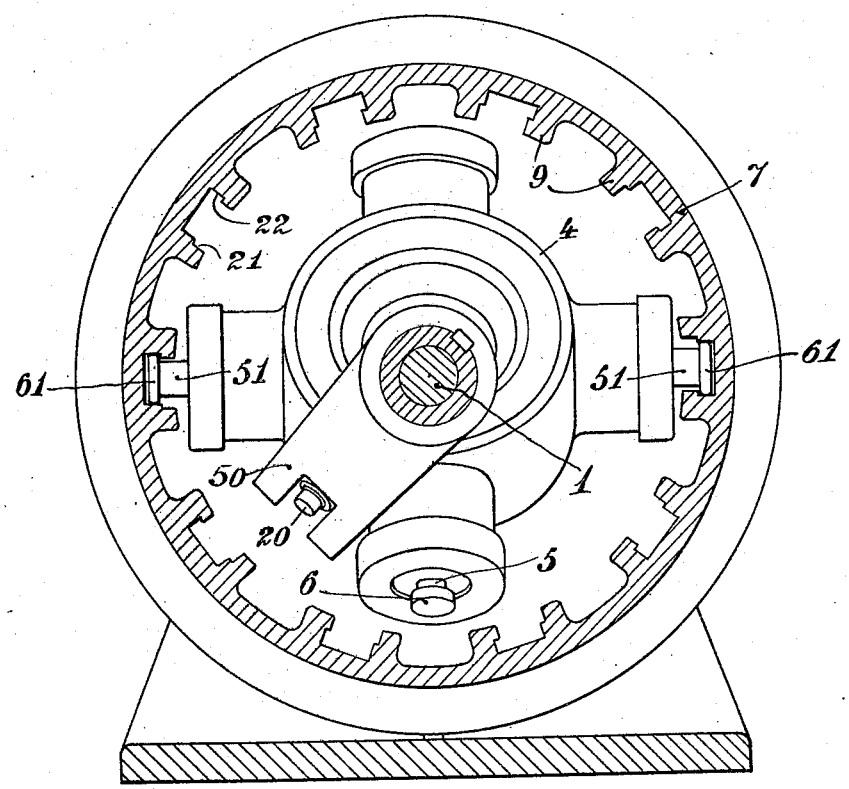

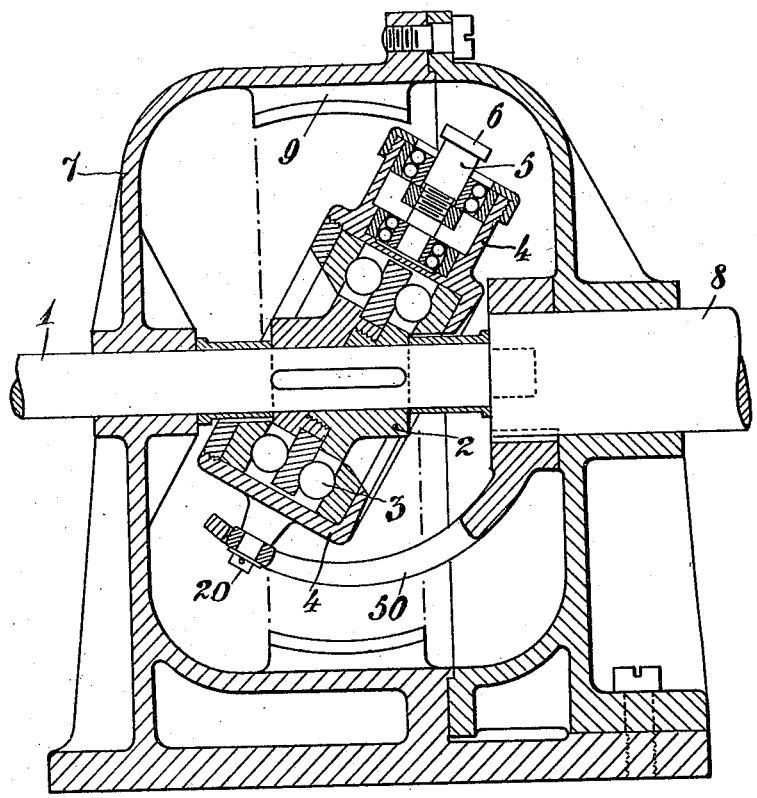
Fig: 6.

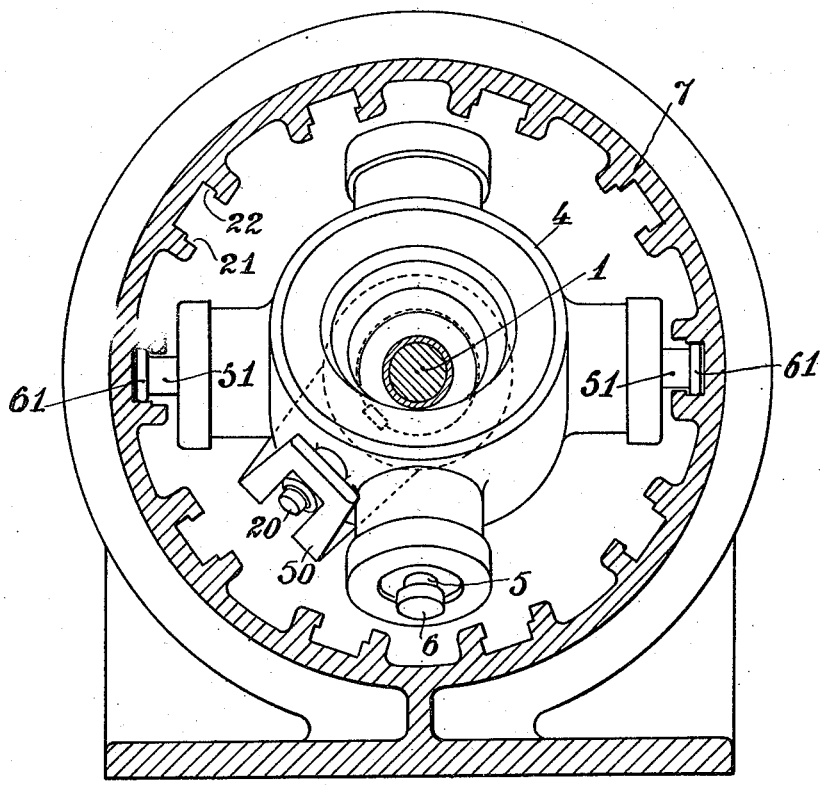

UNITED STATES PATENT OFFICE.

GUNNAR ELIAS CASSEL, OF STOCKHOLM, SWEDEN, ASSIGNOR TO ARTUR LORENZ OLOF ABRAHAM LEFFLER, OF DJURSHOLM, SWEDEN.

POWER-TRANSMISSION GEAR.

1,277,193.  Specification of Letters Patent.  Patented Aug. 27, 1918.

Application filed December 20, 1917. Serial No. 208,085.

*To all whom it may concern:*

Be it known that I, GUNNAR ELIAS CASSEL, a citizen of the Kingdom of Sweden, residing at Stockholm, Sweden, have invented new and useful Improvements in Power-Transmission Gears, of which the following is a specification.

This invention relates to gears for transmitting power between shafts lying in alinement with one another.

The object of the invention is to provide a gear for such shafts which is compact and reliable in its construction and which can be carried out for large ratio of gearing.

According to this invention one member of the gear consists of a gyratory swinging thrust-disk having a number of radial projections, while the other member of the gear consists of a drum or the like formed on its inner periphery with an endless cam slot having a plurality of waves, or with parts of such slot coöperating with said projections.

Figure 1:
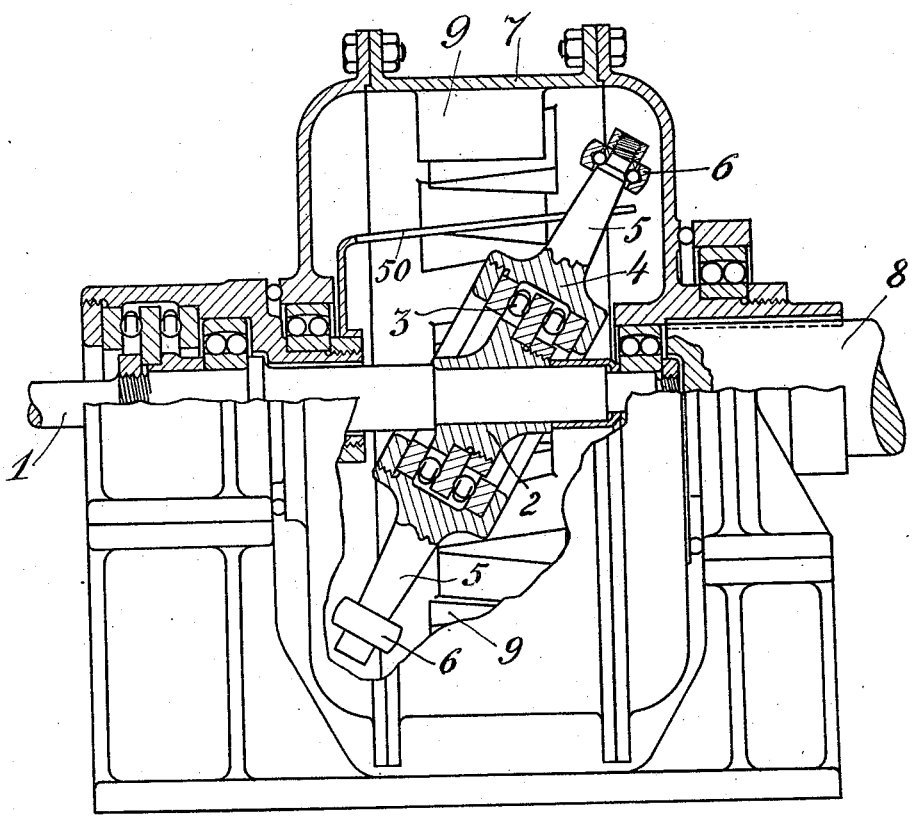
Figure 3:
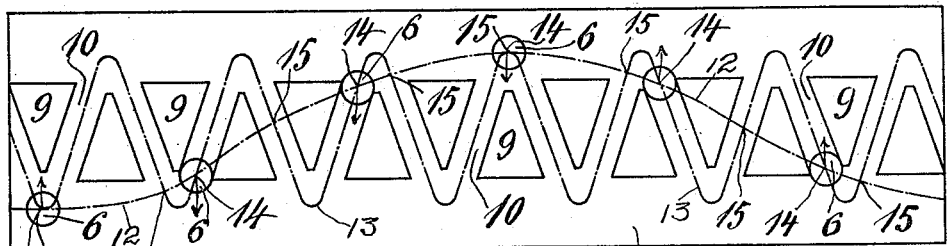
Figure 2:
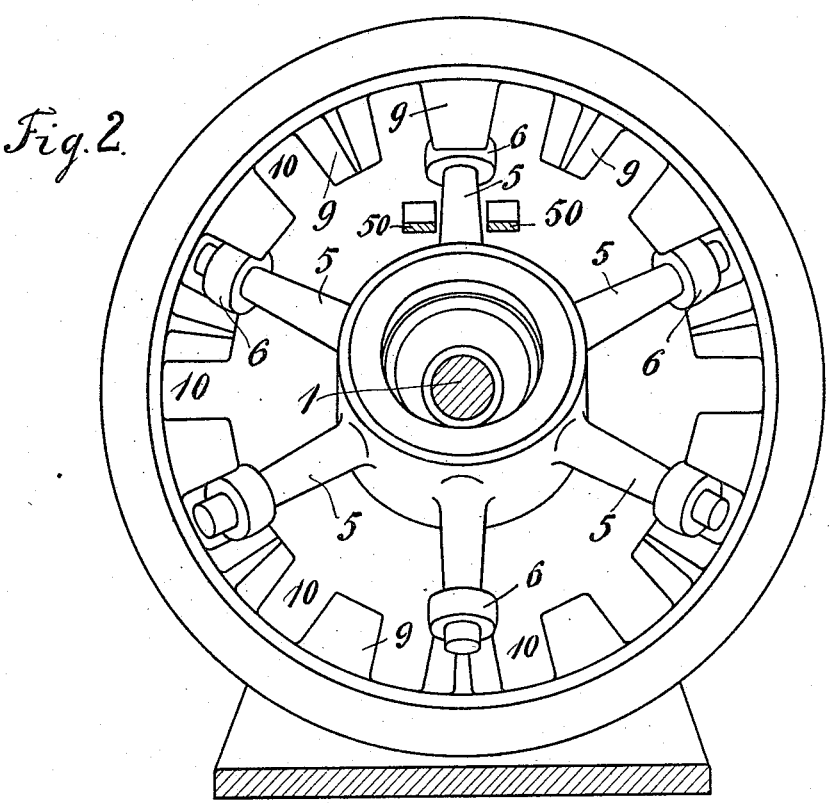

In the accompanying drawing I have shown some embodiments of my invention. Figure 1 is a side elevation and partial section of a power transmission gear according to one embodiment of the invention. Fig. 2 is an end view of the same gear, one end wall of the drum being removed. Fig. 3 is a diagrammatic view of the inner peripheral surface of the drum extending in plane and illustrating the positions of the radial projections in relation to the cam slot of said surface. Fig. 4 is a longitudinal section and Fig. 5 is a cross-section of a gear according to another embodiment of the invention. Fig. 6 is a longitudinal section and Fig. 7 is a cross-section of a third embodiment of the invention.

Referring to Figs. 1 and 2, 1 is the driving shaft journaled in suitable bearings, and 2 is a hub keyed to the driving shaft 1 and supporting a double thrust ball bearing 3, the axis of which is inclined in relation to the axis of the shaft 1. The bearing 3 supports in turn an annular thrust-disk 4 formed on its periphery with six radially extending projections or arms 5 disposed symmetrically, each of said arms being provided with an antifriction roller 6 supported by a ball bearing. 50 is a stationary axially extending guide engaging one of the projections or arms 5 in order to prevent the disk 4 from rotating with the hub 2.

The driven member of the gear consists of a substantially cylindric casing 7, inclosing said disk 4 and, preferably, formed as a closed drum, said casing or drum being rigidly secured to the driven shaft 8 the axis of which is in alinement with the axis of the shaft 1. The peripheral inner surface of the casing 7 is provided with projections 9 forming axially extending wedges, the tops of which are directed alternately in opposite directions thus forming between said projections 9 slots 10 inclined alternately in opposite directions and the width of which corresponds to the diameter of the rollers 6.

In the embodiment shown in Figs. 1 and 2 the drum 7 is provided with fourteen projections 9 and, consequently, with fourteen slots 10 disposed around the inner peripheral surface of the drum.

The device described operates as follows:

During the rotation of the shaft 1 a gyratory swinging movement is imparted by the hub 2 to the disk 4 in such manner, that the arms 5 move successively to and fro in an axial plane a distance depending on the inclination of the bearing 3 in relation to the shaft 1, one movement to and fro being effected by each arm 5 of the disk for each revolution of the shaft 1. During this movement each roller 6, when moving in one direction, passes a slot 10 thereby turning the drum 7 a distance corresponding to the inclination of the slot. When moving in the opposite direction, the roller passes the next slot 10 inclined oppositely to that just passed by the roller thus turning again the drum in the same direction. By using a suitable number of arms 5 on the disk 4 and a corresponding number of rollers engaging the slots 10, each arm will turn the drum during the middle part of its movement only or in other words while possessing its greatest and approximately constant speed. The length of the slots is so chosen, that a roller commences to engage a slot, when the adjacent roller is about to leave another slot. On account thereof the drum 7 will be turned continuously. Since each roller 6 passes two slots for each revolution of the shaft 1 and because fourteen slots are disposed around the drum, the roller will have passed all the slots, when the shaft 1 has performed seven revolutions. The ratio of transmission between the shaft 1 and the drum 7 will, consequently, in this case be =7:1, that is to say equal to half the number of slots provided on the drum. Any desired ratio of gearing can, therefore, be obtained by suitably choosing the number of slots and arms.

In the embodiment above referred to, two diametrically opposite rollers 6 will at the same time pass slots, which are inclined oppositely, thereby affording an advantageous division of the stress exerted on the disk 4 and its arms 5.

Fig. 3 illustrates diagrammatically the mutual motion of the rollers of the oscillating disk and the drum. 7 designates the inner peripheral surface of the drum extended in a plane. 9 designates the projections disposed on said surface, and 10 designates the slots between said projections. 6 designates the rollers of the disk 4 projected on the wall of the drum in a certain position of the disk 4. The arrows designed in said projections 6 indicate the temporary direction of movement of the rollers, when the drum 7 is moving in the direction indicated by the arrow 11. The curve 12 represents the movement of the rollers 6 in relation to the driving shaft 1 for one revolution of said shaft, and the curve 13 represents the movement of said rollers in relation to the drum 7. Since the rollers 6 situated on one half of the periphery of the drum or on one half of the curve 12 move oppositely to those situated on the other half of said periphery or of said curve 12, the former rollers are, consequently, situated on parts of the curve 13 inclined in one direction, while the other rollers are situated on parts of the same curve inclined in the other direction, as the device cannot, otherwise, be capable of operating.

Since the curve 12 intersects each wave of the curve 13 in two different points, except in the top and base points of the curve 12, in which one point of intersection only occurs, two series of points of intersection determining the positions of the rollers are, consequently, obtained, viz., on the one hand, six points 14 located at equal distances apart in peripheral direction and, on the other hand, eight points 15 also located at equal distances apart. In the present case the disk 4 may therefore be provided either, as shown in Fig. 2, with six arms 5 disposed symmetrically or with eight arms likewise symmetrically disposed. The possible number of arms of the disk will, generally, be either one less or one more than half the number of slots devised on the drum, or in other words, for a certain ratio of gearing the possible number of driving arms of the disk will be either one less or one more than the numeral value of said ratio of gearing.

Of the arms thus determined a smaller or greater number may, however, be omitted without interfering with the operation of the device, provided the slots be of such a length, that one arm of the disk 4 does not come out of engagement with a slot, before an adjacent arm has come in engagement with another slot.

Theoretically taken, the slots 10 are to be cut exactly in conformity with the form of the curve 13. Since, however, the arms 5 have a constant or approximately constant speed at that part of their movement used for moving the drum, the slots may, as shown, without inconvenience be formed with straight-lined sides. Of course, nothing prevents from forming the slots as a continuous curve-slot in accordance with the curve 13 representing the movement of the rollers in relation to the movement of the inner peripheral surface of the drum.

The gear described above may be used for both directions of movement. If it is to be used for one direction of movement only, one side only of the slots is required. Therefore, in case of the direction of movement indicated by the arrow 11 in Fig. 3, only the right-hand side of each slot need be formed, and, consequently, instead of the projections 9 shown projections or abutments corresponding to said right-hand side only may be used.

In the embodiment described with reference to Figs. 1–3, the arm 5 engaged by the guide 50 as well as the diametrically opposite arm are caused to move in an axial plane, while the remaining arms, in fact, will not move exactly in axial planes, but will describe eight-shaped curves. Thus, the different arms will not move exactly uniformly with respect to the slots of the drum. By this, inexactness, stresses and undue friction may arise during the working of the gear, or it will be necessary to form the slots with a small play in relation to the rollers coöperating therewith.

This inconvenience is entirely overcome in the embodiments shown in Figs. 4 and 5 and Figs. 6 and 7 respectively.

With reference to the embodiment shown in Figs. 4 and 5, 1 indicates the driving shaft, and 2 the oblique supporting member of the double thrust ball bearing 3. 4 designates the swinging thrust disk supported by said bearing 3. The disk 4 is provided with four radially extending projections, situated at equal angular distances from one another, one pair of diametrically opposite projections being indicated by 5 while the remaining pair of projections is indicated by the numeral 51. The projections are in this case formed as pins journaled in ball bearings and provided with heads 6 and 61 respectively. The disk 4 is further provided with a projection 20 extending radially between two projections 5 and 51 and having, preferably, an antifriction roller engaging a stationary guide 50, situated in a plane through the axis of the shafts 1 and 8.

The drum 7 which is journaled in the stationary frame, is keyed to the driven shaft 8. Between the projections 9 provided on the inner peripheral surface of the drum 7, two curve-shaped slots 21, 22 or parts of two such slots are formed. The slot 21 is adapted to coöperate with the heads 6 of the projections 5, while the slot 22 is adapted to be engaged by the heads 61 of the projections 51. The curve-shaped slots 21, 22 are cut exactly according to the movement of the projections 5 and 51 with respect to the drum 7. As the said slots, therefore, will not be situated quite side by side, they must be placed at different distances from the center of the drum the projections 5 and 51 being correspondingly of unequal length.

The operation of the device shown in Figs. 4 and 5 corresponds to that described above with reference to Figs. 1 and 2, with the exception that the ratio of gearing of the first-mentioned device is equal to 5:1. Owing to the use of different curved slots for the different projections and the cutting of said slots exactly according to the movement of the projections undue stresses and friction are entirely eliminated.

Figs. 6 and 7 show a modification in which the drum 7 is stationary and the guide 50 is rigidly connected to the driven shaft 8 and rotates therewith. Similar characters indicate corresponding parts in the Figs. 4 to 7.

The operation of this gear is as follows: During the rotation of the driving shaft 1 a gyratory swinging movement is imparted to the thrust disk 4. As the projections 5, 51 engage the slots 21 and 22 respectively of the stationary drum 7 the disk 4 will be caused to rotate, said disk performing one revolution for each fifth revolution of the shaft 1. By means of the guide 50 which, while permitting the swinging movement of the disk, must partake in the rotation of the disk 4, the shaft 8 is caused to rotate with the said disk 4.

Further modifications of the invention may be made without departing from the principle or the scope of the invention. For instance, the cylindrical drum 7 may be replaced by a spherical drum, such form being in certain respects more suitable than the cylindrical form, in as much as the rollers 6 (Figs. 1 to 3) or the heads 6, 61 (Figs. 4 to 7) are in fact movable in a path situated on a spherical surface.

The gears may, if desired, be used for transforming a lower speed in a higher speed, in which case the shaft 8 is the driving shaft and the shaft 1 is the driven one.

I claim—

1. A power transmission gear, comprising a rotating shaft, an oblique disk attached to said shaft, a thrust-disk loosely mounted on said oblique disk and performing a gyratory movement during the rotation of said shaft, projections on said thrust-disk, guiding means engaged by said projections, said thrust-disk and said guiding means being adapted to perform a relative rotation during the gyratory movement of the thrust-disk.

2. A power transmission gear, comprising a rotating shaft, an oblique disk attached to said shaft, a thrust-disk loosely mounted on said oblique disk and performing a gyratory movement during the rotation of said shaft, projections on said thrust-disk, guiding means engaged by said projections, stationary means for preventing the thrust-disk from rotation, another shaft connected with said guiding means for rotation therewith during the gyratory movement of the thrust-disk.

3. A power transmission gear, comprising a rotating shaft, an oblique disk attached to said shaft, a thrust-disk loosely mounted on said oblique disk and performing a gyratory movement during the rotation of said shaft, projections on said thrust disk, guiding means engaged by said projections, stationary means for preventing the thrust-disk from rotation, a rotatably mounted casing inclosing said thrust-disk, guiding slots on the inner surface of said casing engaged by said projections to cause the casing to perform a rotary movement during the gyratory movement of the thrust-disk.

4. A power transmission gear, comprising a rotating shaft, an oblique disk attached to said shaft, a thrust-disk loosely mounted on said oblique disk and performing a gyratory movement during the rotation of the shaft, rotatably mounted radially extending projections on said thrust-disk, a casing inclosing said thrust-disk, zig-zag guiding slots on the inner surface of said casing engaged by said projections to cause the thrust-disk and the casing to perform a rotary movement in relation to each other.

5. A power transmission gear, comprising a rotating shaft, an oblique disk attached to said shaft, a thrust-disk loosely mounted on said oblique disk and performing a gyratory movement during the rotation of the shaft, radially extending projections of different length on said thrust-disk, a casing inclosing said thrust-disk, zig-zag slots on the inner surface of said casing disposed at different distances from the axis of the casing and engaged by the said projections.

6. A power transmission gear, comprising a rotating shaft, an oblique disk attached to said shaft, a thrust-disk loosely mounted on said oblique disk and performing a gyratory movement during the rotation of the shaft, radially extending projections, symmetrically disposed on the periphery of said thrust-disk, a casing inclosing said thrust-disk, zig-zag slots on the inner surface of said casing, each of said slots being adapted to be engaged by diametrically opposite projections of the thrust-disk to cause the thrust disk and the casing to perform a rotary movement in relation to each other.

In testimony whereof I have signed my name.

GUNNAR ELIAS CASSEL.

Copies of this patent may be obtained for five cents each, by addressing the "Commissioner of Patents, Washington, D. C."